Figure 2:
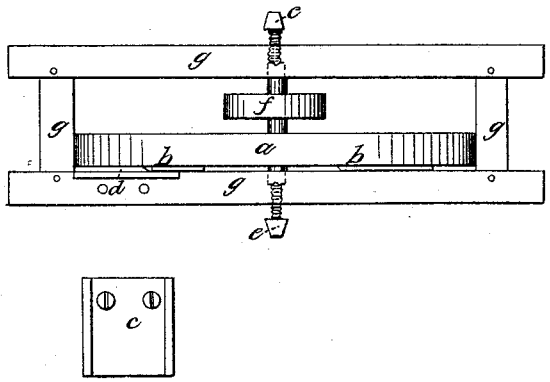
Figure 1:
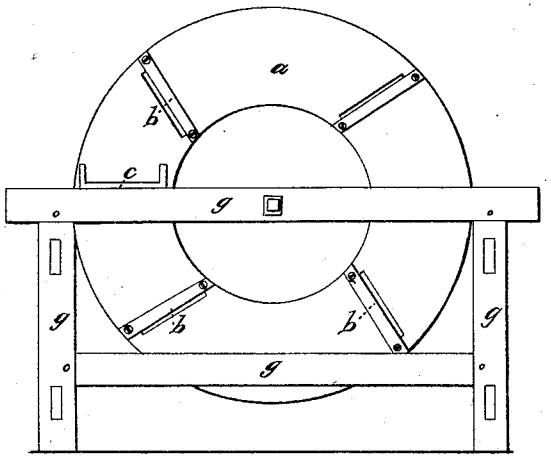

No Printed Specification Available

4203X

E. Morris,

Cutting Dye Wood.

Patented Sep. 27, 1825.

AM. PHOTO-LITHO. CO. N.Y. (OSBORNE'S PROCESS)

MISSING PAGE TEMPORARY NOTICE

PATENT # 4203X FOR ISSUE DATE 9-27-1825

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text